April 12, 1938.  C. E. SWENSON  2,113,998
UNIVERSAL JOINT
Filed Dec. 9, 1932
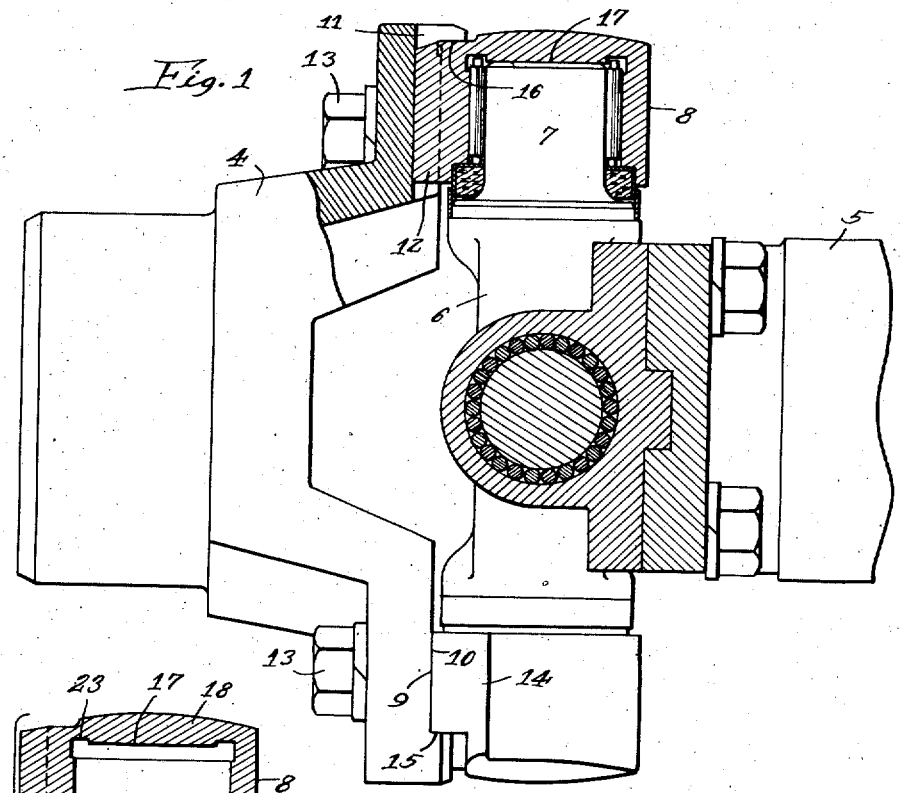
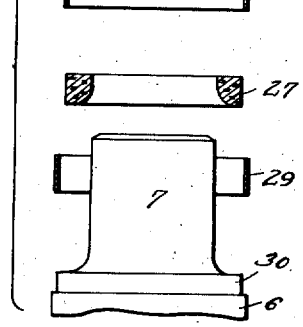
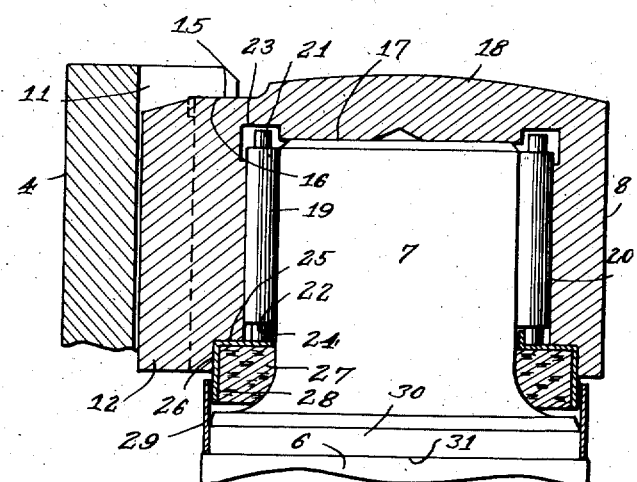
Carl E. Swenson Inventor Patented Apr. 12, 1938

2,113,998

UNITED STATES PATENT OFFICE 2,113,998

UNIVERSAL JOINT

Carl E. Swenson, Rockford, Ill., assignor, by mesne assignments, to Borg-Warner Corporation, Chicago, Ill., a corporation of Illinois Application December 9, 1932, Serial No. 646,432

2 Claims. (Cl. 64—17)

REISSUED
JUL 9 - 1940

This invention relates to an improved trunnion type universal joint and has special reference to one having roller bearings for the trunnions.

In my application, Serial No. 576,249, filed November 20, 1931, I disclosed a universal joint in which each of the trunnion bearings is of unitary construction to facilitate assembling and make for handiness as well as economy in replacement or repair. According to that application, the rollers have reduced cylindrical ends to fit in an annular groove in the inner end of the bearing and to engage an inturned annular lip on a retainer ring pressed into a counterbore in the outer end of the bearing. The retainer ring provides an annular recess for the reception of a packing ring to seal the bearing against loss of lubricant and to exclude dirt. It is the principal object of the present invention to provide a retainer ring so constructed that one end thereof projects from the bearing to form part of a dirt shield, and to provide in connection therewith a sleeve pressed on the spider about the base of the trunnion and surrounding the projecting end of the ring to complete the dirt shield.

The invention is illustrated in the accompanying drawing, in which—

Figure 1 is a side view of a universal joint made in accordance with my invention, showing one trunnion bearing in longitudinal cross-section and another in transverse section;

Fig. 2 is an enlargement of that portion of Figure 1 showing the longitudinal section, and Fig. 3 is a view of the bearing parts appearing in Fig. 2 showing the same in disassembled spaced relation to more clearly illustrate the construction.

The invention is illustrated in connection with a universal joint constructed somewhat along the lines disclosed in my copending application, Serial No. 615,496, filed June 6, 1932 issued as Patent No. 1,985,531, December 25, 1934. A pair of yokes or terminal coupling members are shown at 4 and 5 connected by means of an intermediate transmission member 6, often referred to as the spider, the same providing four trunnions 7, ninety degrees apart. The trunnions are received in bearing blocks 8, each yoke being equipped with one pair of these bearings in diametrically opposed relation. The spider 6 is usually made hollow to serve as a central lubricant reservoir from which lubricant is conducted to the various bearings through radial holes provided in the trunnions 7. As described in the aforesaid application, the yokes are machine finished for true dynamic balance and have smooth seats 9 for abutment by flat faces 10 provided on the backs of the blocks 8. The yokes are milled to provide radial slots 11 for reception of radial lugs 12 on the blocks, and are bored on opposite sides of the slots 11 to receive bolts 13 which thread in holes in the lugs 14 formed on the bearing blocks, whereby to clamp the latter to the yokes. The interfitting lugs and slots assume the load so far as the transmission of torque is concerned. Shoulders 15 are provided on the yokes for engagement with surfaces 16 on the bearing blocks 8 to assume the load incident to end thrust, the trunnions 7 being disposed with the ends thereof arranged to bear against end thrust surfaces 17 provided on the inside of the end walls 18 of the bearing blocks 8. The bolts 13 are, therefore, relieved of load due to end thrust and torque, and serve primarily to clamp the bearing blocks to the yoke members.

The trunnion bearings instead of being plain journal bearings, have anti-friction rollers 19 which make for easier and smoother operation and, consequently, more efficient power transmission and longer life. These rollers run on the side of the trunnions 7 on the one hand, and on the other hand have bearing contact with the side wall 20 of the cylindrical bearing recess provided in the bearing blocks 8. The rollers have reduced cylindrical ends 21 and 22. The inner ends 21 fit in an annular channel-shaped groove 23 formed in the end wall 18 of the bearing, thus avoiding the necessity for any separate retainer means for the rollers at that end. The groove 23 is made wider than the diameter of the ends 21 because it is intended only to serve as a retaining recess for the ends of the rollers to keep the same from dropping out when the bearing is removed from the trunnion. In other words, it is not intended to have the ends 21 of the rollers find bearing support in the groove 23. The outer ends 22 of the rollers are retained by means of an inturned lip 24 formed on the sheet metal ring 25 which is pressed into a counterbore 26 provided in the outer end of the bearing. With this construction it is apparent that each bearing block with its complement of rollers is a unit which may be removed and replaced with facility, for inspection, repair or replacement. The ring 25, in addition to serving as a retainer for the rollers, affords the necessary annular recess in the outer end of the bearing for reception of a packing ring 27 of any suitable compressible, resilient, packing material, such as cork. The packing ring is entered into the retainer ring before the bearing is slipped over the trunnion, and is arranged to be subjected to a certain amount of compression when the bearing is brought into its final position, thus serving to seal the bearing against loss of lubricant or entry of dirt.

In accordance with the present invention, the retainer ring 25 in each of the trunnion bearings is adapted to serve not only as a means of retaining the rollers 19 and housing the packing ring 27, but also as a part of a dirt shield for the trunnion bearing. With that object in view, the ring 25 is constructed so that the outer end thereof projects appreciably from the counterbore 26, as indicated at 28, to form the inner part of the dirt shield. The outer part of the dirt shield is formed by a sleeve 29 projecting outwardly from the arm of the spider and encircling the end 28 of the retainer ring 25. The sleeve is suitably pressed onto the arm of the spider on a reduced portion 30, with the end thereof brought into abutment with the shoulder 31 defining the end of the reduced portion, so as to locate the sleeve in a predetermined relation to the bearing and also insure the proper clearance with respect to the retainer ring.

In operation, it should be clear that the sleeves 29 will serve to keep out dirt and water, so that the principal function of the packing rings 27 will be merely that of retaining lubricant. The fact that the sleeves 29 project outwardly from the arms of the spider 6 and encircle the projecting ends of the retainer rings, makes centrifugal force effective in keeping out dirt and water, because any dirt or water getting on the sleeves will naturally be thrown outwardly and will, therefore, have no opportunity to work its way in between the sleeves and rings and eventually into the bearings.

I claim:

1. A universal joint trunnion bearing assembly comprising a bearing having a cylindrical inner wall, a trunnion member having spaced coaxial walls, bearing rollers engaging said bearing wall and the inner of said trunnion member walls and holding them coaxial, means cooperating with said bearing for maintaining said rollers in cooperative relation to said inner walls, packing means spaced from the outer of said trunnion member walls and cooperating with said roller maintaining means in providing a seal between said bearing and said inner trunnion wall, said roller maintaining means being closely telescoped in the outer of said trunnion member walls to shield said packing means.

2. A universal joint trunnion bearing assembly comprising a bearing having a cylindrical inner wall, a trunnion member having spaced coaxial walls, bearing rollers engaging said bearing wall and the inner of said trunnion member walls and holding them coaxial, means cooperating with said bearing for maintaining said rollers in cooperative relation to said inner walls, packing means spaced from the outer of said trunnion member walls and cooperating with said roller maintaining means in providing a seal between said bearing and said inner trunnion wall, said roller maintaining means being closely telescoped with the outer of said trunnion member walls to shield said packing means, the telescoping portions being so arranged that the surrounding portion extends radially outwardly beyond the inner end of surrounded portion.

CARL E. SWENSON.

DISCLAIMER 2,113,998.—*Carl E. Swenson*, Rockford, Ill. UNIVERSAL JOINT. Patent dated April 12, 1938. Disclaimer filed December 2, 1938, by the assignee, *Borg-Warner Corporation*.

Hereby disclaims from the scope of both of the claims of said Letters Patent, any and all universal joints except those wherein the outer of the trunnion walls mentioned in said claims is in the form of a collar separate from and mounted upon a shoulder formed integrally with the trunnion, wherein both the packing means and the roller maintaining means are received in an annular space defined between radially opposed regions of said trunnion walls and wherein said packing means is in contact with the inner trunnion wall and under compression in the assembled joint.

[*Official Gazette December 20, 1938.*]

when the bearing is brought into its final position, thus serving to seal the bearing against loss of lubricant or entry of dirt.

In accordance with the present invention, the retainer ring 25 in each of the trunnion bearings is adapted to serve not only as a means of retaining the rollers 19 and housing the packing ring 27, but also as a part of a dirt shield for the trunnion bearing. With that object in view, the ring 25 is constructed so that the outer end thereof projects appreciably from the counterbore 26, as indicated at 28, to form the inner part of the dirt shield. The outer part of the dirt shield is formed by a sleeve 29 projecting outwardly from the arm of the spider and encircling the end 28 of the retainer ring 25. The sleeve is suitably pressed onto the arm of the spider on a reduced portion 30, with the end thereof brought into abutment with the shoulder 31 defining the end of the reduced portion, so as to locate the sleeve in a predetermined relation to the bearing and also insure the proper clearance with respect to the retainer ring.

In operation, it should be clear that the sleeves 29 will serve to keep out dirt and water, so that the principal function of the packing rings 27 will be merely that of retaining lubricant. The fact that the sleeves 29 project outwardly from the arms of the spider 6 and encircle the projecting ends of the retainer rings, makes centrifugal force effective in keeping out dirt and water, because any dirt or water getting on the sleeves will naturally be thrown outwardly and will, therefore, have no opportunity to work its way in between the sleeves and rings and eventually into the bearings.

I claim:

1. A universal joint trunnion bearing assembly comprising a bearing having a cylindrical inner wall, a trunnion member having spaced coaxial walls, bearing rollers engaging said bearing wall and the inner of said trunnion member walls and holding them coaxial, means cooperating with said bearing for maintaining said rollers in cooperative relation to said inner walls, packing means spaced from the outer of said trunnion member walls and cooperating with said roller maintaining means in providing a seal between said bearing and said inner trunnion wall, said roller maintaining means being closely telescoped in the outer of said trunnion member walls to shield said packing means.

2. A universal joint trunnion bearing assembly comprising a bearing having a cylindrical inner wall, a trunnion member having spaced coaxial walls, bearing rollers engaging said bearing wall and the inner of said trunnion member walls and holding them coaxial, means cooperating with said bearing for maintaining said rollers in cooperative relation to said inner walls, packing means spaced from the outer of said trunnion member walls and cooperating with said roller maintaining means in providing a seal between said bearing and said inner trunnion wall, said roller maintaining means being closely telescoped with the outer of said trunnion member walls to shield said packing means, the telescoping portions being so arranged that the surrounding portion extends radially outwardly beyond the inner end of surrounded portion.

CARL E. SWENSON.

DISCLAIMER 2,113,998.—*Carl E. Swenson*, Rockford, Ill. UNIVERSAL JOINT. Patent dated April 12, 1938. Disclaimer filed December 2, 1938, by the assignee, *Borg-Warner Corporation*.

Hereby disclaims from the scope of both of the claims of said Letters Patent, any and all universal joints except those wherein the outer of the trunnion walls mentioned in said claims is in the form of a collar separate from and mounted upon a shoulder formed integrally with the trunnion, wherein both the packing means and the roller maintaining means are received in an annular space defined between radially opposed regions of said trunnion walls and wherein said packing means is in contact with the inner trunnion wall and under compression in the assembled joint.

[*Official Gazette December 20, 1938.*]

DISCLAIMER 2,113,998.—*Carl E. Swenson*, Rockford, Ill. UNIVERSAL JOINT. Patent dated April 12, 1938. Disclaimer filed December 2, 1938, by the assignee, *Borg-Warner Corporation*.

Hereby disclaims from the scope of both of the claims of said Letters Patent, any and all universal joints except those wherein the outer of the trunnion walls mentioned in said claims is in the form of a collar separate from and mounted upon a shoulder formed integrally with the trunnion, wherein both the packing means and the roller maintaining means are received in an annular space defined between radially opposed regions of said trunnion walls and wherein said packing means is in contact with the inner trunnion wall and under compression in the assembled joint.

[*Official Gazette December 20, 1938.*]